United States Patent [19]

Moore et al.

[11] 4,155,470
[45] May 22, 1979

[54] STRAIN REDUCING TRANSFER MEMBER

[75] Inventors: R. Dale Moore, Wheaton; Norbert P. Borowski, Darien, both of Ill.

[73] Assignee: International Harvester Company, Chicago, Ill.

[21] Appl. No.: 874,163

[22] Filed: Feb. 1, 1978

[51] Int. Cl.² .................................................. E02F 3/81
[52] U.S. Cl. .................................. 414/727; 182/228; 403/263
[58] Field of Search ............................ 214/145 R, 152; 212/144; 182/228; 403/244, 253, 263

[56] References Cited

U.S. PATENT DOCUMENTS

| | | | |
|---|---|---|---|
| 2,776,080 | 1/1957 | Hopfeld | 182/228 |
| 3,058,777 | 10/1962 | Froedge | 182/228 |
| 3,254,780 | 6/1966 | Midtbo | 214/145 R |

Primary Examiner—Francis S. Husar
Assistant Examiner—Ross Weaver
Attorney, Agent, or Firm—William H. Wendell; Ronald C. Kamp; F. David AuBuchon

[57] ABSTRACT

A boom assembly for a loader that is pivotally mounted on a tractor. The assembly includes a pair of boom arms which are pivotally connected at one end of the tractor. The arms are fabricated from two C-channels which are welded together. The arms have aligned inside apertures sized to accept a tube which is rigidly connected to both channels. The assembly is completed when a cross tie member envelopes the tubes and is rigidly secured to the inner C-channels.

2 Claims, 6 Drawing Figures

STRAIN REDUCING TRANSFER MEMBER

BACKGROUND OF THE INVENTION

This invention relates generally to tractor loaders and, more particularly, concerns the boom assembly of the loaders.

The conventional arrangement for a loader boom assembly consists of a pair of boom arms which are spaced apart by cross tie members that maintain a uniform distance between the boom arms. The three basic configurations of the boom arms are a solid plate, a box structure formed by single, multiple bend, wraparound sheet and a box structure formed by welding two C-channels.

Although the solid plate and the single piece wraparound boom configurations have the best strength characteristics, the expense of obtaining a plate of proper thickness and size, and the expense of forming the single piece wraparound box have made the C-channel box configuration the most popular among today's manufacturers because of its lower manufacturing cost. The use of this least expensive C-channel box boom structure has presented design difficulties because it includes four bends and a continuous weld between the channels which weaken the structure in the twisting load mode. To overcome this weakness the position setting cross tie members have been extended completely through both channels and have seen welded to both channels to supply the necessary twisting strength to the configuration.

When the cross ties were modified in this manner to perform a dual function, the design change produced a multiplicity of problems for the industry. The first of these problems arose from the modifications in the assembly procedure that were necessitated by the structural change in the boom assembly. The new assembly procedure as set forth in U.S. Pat. No. 3,254,780 issued on June 7, 1966, in which the assembly sequence of welding the C-channels into a box structure, cutting the holes for the boom implement and cross tie member and welding the cross tie members to both boom arms. This assembly sequence increases the cost of manufacturing the boom assembly because it requires a very accurate forming of the individual C-channels and a drilling process to produce the necessary holes.

These other difficulties with this passthrough cross tie configuration involve weaknesses in the actual structure of the assembly. The first of the structural weaknesses is caused by the stress risers which are produced in the C-channels when the cross tie holes are drilled therein. Although the embracing effect of the passthrough cross ties does increase the twisting strength of the boom arms, the holes in the sides of the boom arms cause stress risers which decrease the strength of the assembly in the normal straight lifting mode. The remaining two structural weaknesses are the result of the dirty and damp environment in which the tractor loaders operate. This environment will weaken the passthrough cross ties by exposing the external welds of the cross ties to rust, and will also attack the integrity of the cross tie itself by filling the open ended cross tie with dirt and moisture that once again will weaken the structure through rust.

It is, therefore an object of the present invention to provide a C-channel boom arm which has increased twist strength with minimal effect on the strength of the boom arm in other loading modes while giving a positioning characteristic to the cross tie.

Additionally, it is an object of the present invention to provide a C-channel boom arm with the above increased twist strength of the arm without increasing its susceptibility to the corrosive environment in which it must operate.

Further it is an object of the invention to provide a method of fabricating the above-described boom arm assembly which maximizes the efficiency of the fabrication thereby minimizing the expense of the process.

SUMMARY OF THE INVENTION

A boom assembly for a loader that is pivotally mounted on a tractor. The assembly includes a pair of boom arms which ar pivotally connected at one end of the tractor. The arms are fabricated from two C-channels which are welded together. The arms have aligned inside apertures sized to accept a tube which is rigidly connected to both channels. The assembly is completed when a cross tie member envelopes the tubes and is rigidly secured to the inner C-channels.

BRIEF DESCRIPTION OF THE DRAWINGS

Other objects and advantages of the invention will become apparent upon reading the following detailed description and upon reference to the drawings, in which.

DETAILED DESCRIPTION OF THE INVENTION

Figure 1:
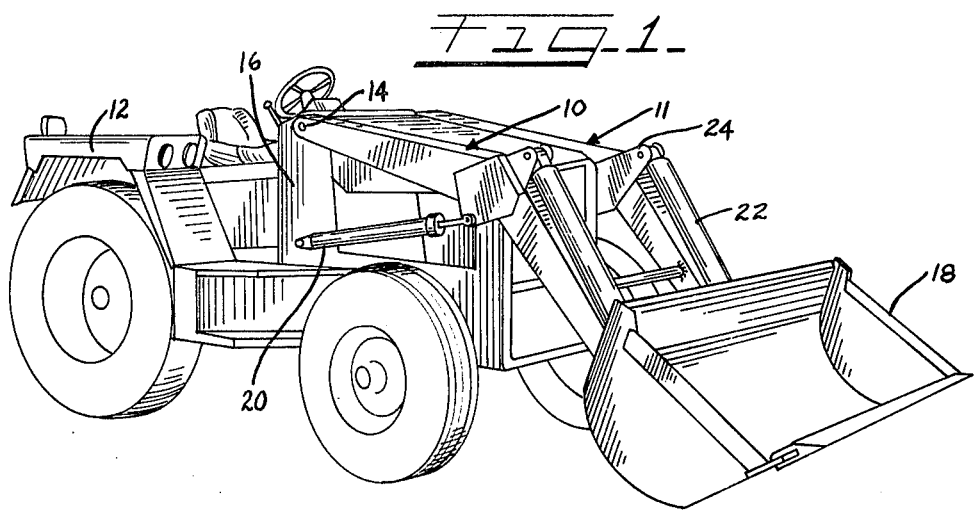
FIG. 1 is a right side perspective view of a tractor and loader incorporating the present invention's boom assembly.

Turning first to FIG. 1, the boom assembly 10 of the present invention is shown mounted on a tractor 12 by a pivotal connection 14 to the tractor body 16. In the preferred embodiment the implement, a bucket 18, is pivotally connected to the forward portion of the boom assembly 10. Both the boom assembly and the bucket are controlled through hydraulic cylinders 20 and 22, respectively, of the tractor 12 through pivot plates 24 which are attached to the boom assembly 10.

Figure 5:
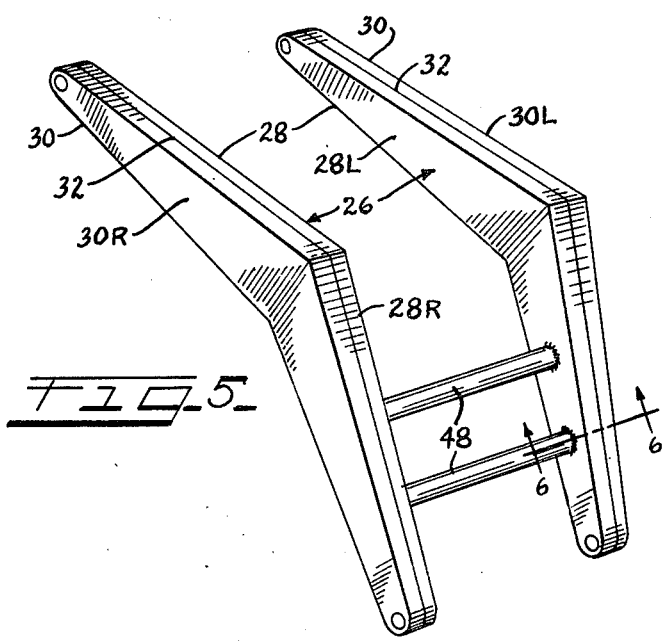
FIG. 5 is a perspective view of the boom arm assembly.

Although the bucket and hydraulic control arrangement of the above-described tractor loader 11 are conventional, the boom arm assembly, shown in more detail in FIGS. 2 through 6, is not a conventional boom arm assembly. As shown in FIG. 5 the unique boom arm assembly 10 of the present invention includes two boom arms 26 which are fabricated from matched pairs of inner C-channels 28 and outer C-channels 30 which are welded together along line 32. In the preferred embodiment the boom arms 26 are spaced apart by a pair of tubular cross tie members 48 forward of the tractor 12.

Figures 2, 3, 4:
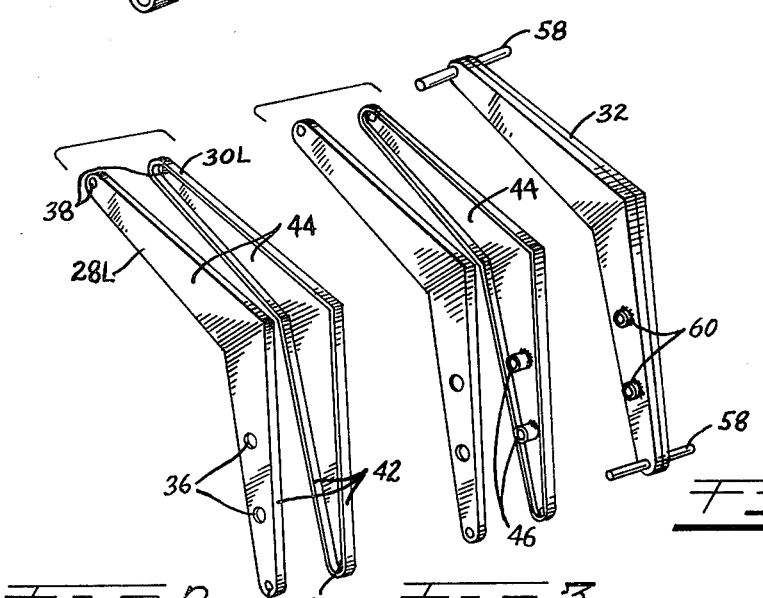
FIG. 2 is a figure showing the first step in the assembly procedure for the boom arm.
FIG. 3 is a figure showing the second step in the assembly procedure for the boom arm.
FIG. 4 is a figure showing the third step in the assembly procedure for the boom arm.

A detailed examination of the boom arms 26, see FIG. 2, will show that the left hand inner C-channel 28L and the left hand outer C-channel 30L are identical except for the cross tie apertures 36 in the inner channels 28L. The same relationship exists between the right hand inner channel 28R and the right hand outer channel 30R. In view of this mirror image relationship between the boom arm C-channels, the following description of the assembly sequence will focus on only the left hand boom arm and the cross ties.

The first step of the preferred method of the boom assembly is shown in FIG. 2 which depicts the formed and punched inner C-channel 28L and the other C-channel 30L. In the first step, sheet metal blanks are cut to the proper shape and the apertures are punched in the blanks. The inner C-channel blanks include the boom pivot aperture 38, the bucket pivot aperture 40 and the cross tie aperture 36, while the outer C-channel blanks include only the boom pivot aperture 38 and the bucket pivot aperture 40. These blanks are then formed into C-channels having a pair of horizontal surfaces 42 and a vertical surface 44, with the vertical surface containing the apertures. The final phase in the first step of the fabrication method is to form the tubes 46 and the tubular cross tie members in the proper spacing length and size diameters to have the tubes 46 pass through the cross tie aperertures 36, while the cross tie members 48 envelope the tubes 46 and space the boom arms.

The second step of the preferred method is to weld the tubes 46 in position on the inside of the vertical surfaces 44 of the outer C-channels 30L and 30R, see FIG. 3. With the collars in position, the inner C-channels 28L and 28R are now positioned to have the edges of their horizontal surfaces 42 contact the edges of the outer C-channel horizontal surfaces 42. In this orientation the tubes 46 pass through the cross tie apertures 36. The tubes have a first section 54 inside the box shape 55 of the boom arms 26 with a second section of the tubes extending outside the box shape 55 above the boom arms, see FIG. 6. This contact between the C-channels, and between the inner C-channels and the tubes is established by either using pins 58 through the boom and bucket apertures, 38 and 40 respective, or by using a tight fit between the tubes 46 and the cross-tie apertures 36, and then clamping the C-channels together.

Figure 6:
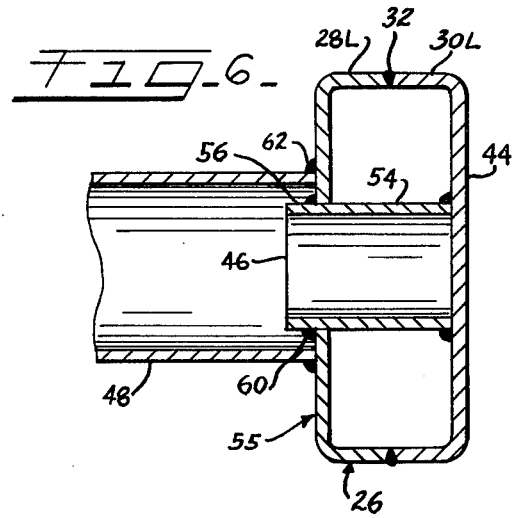
FIG. 6 is a sectional view taken along line 6–6 of FIG. 5. While the invention will be described in connection with a preferred embodiment and procedure, it will be understood that it is not intended to limit the invention to that embodiment and procedure. On the contrary, it is intended to cover all alternatives, modifications, and equivalents as may be included within the spirit and scope of the invention as defined by the appended claims.

Having thus positioned the inner C-channels, the outer C-channels and the tubes, the C-channels are now welded together along their contact edges line 32 and the inner C-channel is welded to the tubes along the circumference 60 of the cross tie aperture 36. The final step of the preferred method establishes the spacing between the boom arms 26 by welding the cross tie member 48 to the inner C-channels 28, see FIGS. 5 and 6. Turning to FIG. 6 the cross tie member 48 is sized to fit over and envelope the tube 46 thereby making the weld circumference 62 the circumference of the outside diameter ofthe cross tie member 48.

Thus it is apparent that there has been provided, in accordance with the invention, a boom assembly and manufacturing procedure therefore that fully satisfies the objects, aims, and advantages set forth above. While the invention has been described in conjunction with specific embodiments thereof, it is evident that many alternatives, modifications, and variations will be apparent to those skilled in the art in light of the foregoing discription. Accordingly, it is intended to embrace all such alternatives, modifications, and variations as fall within the spirit and broad scope of the appended claims.

What is claimed is:

1. Lift arm structure for a power loader adapted for longitudinal support on a tractor comprising; left-and right-hand fore-and-aft extending lift arms disposed on opposite side of the tractor and having one of their ends adapted for horizontal pivotial connection to the tractor and extending longitudinally from said ends to portions disposed beyond and in front of the tractor, each of the arms being composed of an outer U-shaped channel facing inward and a complementary inner U-shaped channel facing outward and joined by upper and lower central fore-and-aft extending welding beads forming the adjoined U-shape channel into a box-shape channel; a pair of tubular sections, each having inner and outer ends, the outer ends of each section abutting the upright flange of one of the outer channels and secured thereto by welding and the inner end of each section extending inward beyond the upright flange of the associated inner channel and secured thereto by welding; and a rigid, transverse cross tie member rigidly joining the portion of the left-and right-hand lift arms beyond the end of the loader, with each end of the cross tie member positioned over the inner end of said tubular section and welded to the upright flange of the inner channels.

2. Lift arm structure for a power loader adapted for longitudinal support on a tractor comprising; left-and right-hand fore-and-aft extending lift arms disposed on opposite side of the tractor and having one of their ends adapted for horizontal pivotial connection to the tractor and extending longitudinally from the ends to portions disposed beyond and in front of the tractor, each of the arms being composed of an outer U-shaped channel facing inward and a complementary inner U-shaped channel facing outward and joined by upper and lower welding forming the adjoined U-shaped channel into a box-shaped channel; a tubular section extending through the upright flange of each of the inner channels and abutting the upright flange of the associated outer channel, the tubular section being secured to the upright flanges by welding and a rigid, transverse cross tie member rigidly joining the portion of the left-and right-hand lift arms beyond the end of the tractor, with each end of the cross tie member positioned over said tubular sections and welded to the upright flanges of the inner channels.

* * * * *